United States Patent
Schumacher et al.

(10) Patent No.: US 9,992,929 B2
(45) Date of Patent: Jun. 12, 2018

(54) CONNECTING ARRANGEMENT FOR CONNECTING A MOWER KNIFE DRIVE TO A RECIPROCATING MOWER KNIFE

(71) Applicant: EWM Eichelhardter Werkzeug- und Maschinenbau GmbH, Eichelhardt (DE)

(72) Inventors: Heinrich Gunter Schumacher, Eichelhardt (DE); Andreas Roth, Neunkirchen-Seelscheid (DE)

(73) Assignee: EWM Eichelhardter Werkzeug- und Maschinenbau GmbH, Eichelhardt (DE)

( * ) Notice: Subject to any disclaimer, the term of this patent is extended or adjusted under 35 U.S.C. 154(b) by 0 days. days.

(21) Appl. No.: 15/368,581

(22) Filed: Dec. 3, 2016

(65) Prior Publication Data

US 2017/0118909 A1    May 4, 2017

Related U.S. Application Data

(63) Continuation of application No. PCT/EP2015/061767, filed on May 27, 2015.

(30) Foreign Application Priority Data

Jun. 4, 2014  (DE) .................. 10 2014 107 834

(51) Int. Cl.
   *A01D 34/13*  (2006.01)
   *A01D 34/33*  (2006.01)
   *A01D 69/12*  (2006.01)
(52) U.S. Cl.
   CPC ............ *A01D 34/33* (2013.01); *A01D 69/12* (2013.01)

(58) Field of Classification Search
   CPC ................... A01D 34/33; A01D 69/12
   (Continued)

(56) References Cited

U.S. PATENT DOCUMENTS

| | | | | |
|---|---|---|---|---|
| 1,769,441 A | * | 7/1930 | Lochbaum | A01D 34/33 56/303 |
| 2,835,133 A | * | 5/1958 | Rogers | A01D 34/30 56/296 |

(Continued)

FOREIGN PATENT DOCUMENTS

| | | |
|---|---|---|
| DE | 1018255 | 10/1957 |
| DE | 3208870 | 9/1983 |

(Continued)

OTHER PUBLICATIONS

International Search Report and Written Opinion of the ISA for PCT/EP2015/061767, ISA/EP, dated Sep. 1, 2015, with English translations thereof.

(Continued)

*Primary Examiner* — Thomas B Will
*Assistant Examiner* — Mai T Nguyen
(74) *Attorney, Agent, or Firm* — Harness, Dickey & Pierce, P.L.C.

(57) ABSTRACT

A connecting arrangement (1) for connecting a mower knife drive to a mower knife (7), that moves back and forth along a knife or X-axis, has a driving element (2) and an output element (3). The driving element (2) connects the connecting arrangement (1) to the mower knife drive. The output element (3) connects the connecting arrangement (1) to the mower knife (7). The driving element (2) and the output element (3) rotate relative to one another about three mutually perpendicular axes of rotation (X, Y, Z). Also, the (Continued)

driving element (2) and output element (3) can be moved relative to one another along at least two of the axes of rotation (Y, Z).

12 Claims, 3 Drawing Sheets

(58) Field of Classification Search
USPC .......................................... 56/264, 271, 296
See application file for complete search history.

(56) References Cited

U.S. PATENT DOCUMENTS

| | | | |
|---|---|---|---|
| 2,850,864 A * | 9/1958 | Rohweder | A01D 34/30 56/257 |
| 2,912,814 A * | 11/1959 | Witt | A01D 34/30 56/296 |
| 3,648,444 A * | 3/1972 | Dunn | A01D 34/30 56/296 |
| 4,023,333 A * | 5/1977 | Anderson | A01D 34/30 56/208 |
| 4,103,556 A * | 8/1978 | Niday | A01D 34/30 56/296 |
| 5,778,727 A * | 7/1998 | Richardson | A01D 34/30 56/296 |
| 6,216,429 B1 * | 4/2001 | McCredie | A01D 34/32 56/287 |
| 7,121,074 B1 * | 10/2006 | Regier | A01D 34/305 56/296 |
| 8,307,727 B2 * | 11/2012 | Yim | F16C 3/06 74/44 |
| 2005/0086919 A1 * | 4/2005 | Stiefvater | A01D 34/30 56/10.8 |
| 2011/0110707 A1 | 5/2011 | Schumacher | |
| 2014/0026528 A1 * | 1/2014 | Thiboutot | A01D 34/03 56/10.7 |

FOREIGN PATENT DOCUMENTS

| | | |
|---|---|---|
| DE | 3931736 | 4/1991 |
| DE | 4035528 | 5/1992 |
| DE | 9416675 | 12/1994 |
| DE | 102005048766 | 5/2007 |
| EP | 1 832 154 | 9/2007 |
| EP | 2 319 287 | 5/2011 |

OTHER PUBLICATIONS

English Translation of the International Preliminary Report on Patentability (Ch. I), IB/Geneva, dated Dec. 6, 2016, incorporating the English Translation of the Written Opinion of the ISA.

* cited by examiner

CONNECTING ARRANGEMENT FOR CONNECTING A MOWER KNIFE DRIVE TO A RECIPROCATING MOWER KNIFE

CROSS-REFERENCE TO RELATED APPLICATIONS

This application is a continuation of International Application No. PCT/EP2015/061767, filed May 27, 2015, which claims priority to German Application No. 10 2014 107 834.9, filed Jun. 4, 2014. The disclosures of the above applications are incorporating herein by reference.

FIELD

The disclosure relates to a connecting arrangement that connects a mower knife drive to a mower knife. The drive movably reciprocates along a knife axis. The drive is especially for agricultural machines, for example, combine harvesters and field choppers. The connecting arrangement has a driving element that couples the connecting arrangement to the mower knife drive. Furthermore, the connecting arrangement has an output element that couples the connecting arrangement to a mower knife. Thus, the mower knife drive is drive-wise connected, via the connecting arrangement, to the mower knife.

BACKGROUND

DE 40 35 528 C2 describes a connecting arrangement between a mower knife drive and a mower knife. The drive movingly linearly reciprocates a double knife cutter unit of front mowers.

The introduction of a lifting movement takes place by means of a pivotably moved driving lever and a drive pin connected to it. The drive pin represents a connecting element. A further connecting element, comprising a joint bearing, is connected to the mower knife. The joint arrangement is necessary since the drive pin is moved, due to its connection to the driving lever, following its pivot movement on a circular section path. The mower knife is only guided linearly in a reciprocating manner. The arrangement, during operation, enables constant pivotal movement of the drive pin relative to the connecting element connected to the mower knife as well as an axial displacement of the drive pin. The first connecting element, connecting to the mower knife, has a ring-shaped portion and a circular cylindrical bore. The intermediate ring, closed in a circumferential direction, is accommodated by its circular cylindrical outer face in the bore. The intermediate ring is adapted to the bore and retained in it. The intermediate ring has a hollow sphere-like inner face. On this hollow-spherical inner face, a bearing ring, closed in circumferential direction, is accommodated with a spherical outer face in a pivotable manner. The bearing ring has a circular cylindrical through bore. The drive pin slidable rests along the axis of the through bore, in the through bore, to be able to compensate positional change. This results from the movement of the drive pin with the driving lever on a circular path relative to the moving axis of the mower knife.

Mower knife drives are known where the mower knife is driven directly linearly in a reciprocating manner by a gearbox. One example is described in DE 39 31 736 C2 or DE 10 2005 048 766 A1. A driving journal of the gearbox reciprocatingly moves and is connected to a driving element of a connecting arrangement. Thus, during the movement at an optimal alignment of the gearbox and of the mower knife relative to each other, no constant relative movements need to be compensated for during the driving of the mower knife. However, EP 1 832 154 A1 shows an adjustment possibility. It enables an adaptation of the relative position of the components relative to each other during assembly. This adjustment is retained by tightening the parts. Also, an easy loosening remains possible for exchange purposes, for example of the mower knife.

However, it has been shown that increased wear occurs due to positional or manufacturing tolerances or deformations during operation when using a mower knife drive according to DE 39 31 736 C2 or DE 10 2005 048 766 A1, even with the direct linear driving of the mower knife. The increased wear is caused by one or more malpositions or inclined positions of the movement axis of the drive journal of the mower knife drive relative to the mower knife axis.

SUMMARY

It is an object of the present disclosure to provide a connection arrangement that compensates for positional and manufacturing tolerances between a mower knife drive and a mower knife.

The object is achieved by a connecting arrangement, for connecting a mower knife drive to a mower knife, that movably reciprocates along a knife axis. The connection arrangement includes a driving element to connect the connecting arrangement to a mower knife drive. An output element connects the connecting arrangement to the mower knife. The driving element and the output element are, via a compensation arrangement, rotatable around three axes of rotation arranged preferably at a right angle to each other. Also, the driving element and output element are displaceable along at least two of the named axes of rotation relative to each other.

An advantage of the connecting arrangement according to the disclosure is that compensation movements are possible during operation between the movements of the mower knife drive and the mower knife. All degrees of freedom are possible except the linear reciprocating movement in direction of the knife axis. Therefore, rotational movements of the driving element and of the output element are possible around all axes of rotation in the Cartesian coordinate system. Furthermore, linear movements are possible along two of the axes of rotation. However, linear movement is not possible in the direction of the knife axis. Thus, two named axes of rotation, along which the driving element and the output element are displaceable relative to each other, are arranged at a right angle to the knife axis.

A separate bearing is provided for each axis of rotation of the compensation arrangement. Thus, the rotational movements can take place independently of each other in the individual degrees of freedom. Further, the driving element and the output element are rotatable relative to each other.

The driving element and the output element are displaceable relative to each other by means of two of the named bearings. Thus, the longitudinal movements, concerning the two degrees of freedom in the longitudinal direction, can be arranged independently relative to each other.

The compensation arrangement has a first joint element and a second joint element. The output element is rotatably connected, via a first bearing, around a first axis of rotation of the named axes of rotation to the first joint element. The first joint element is rotatably connected, via a second bearing, around a second axis of rotation of the named axes of rotation to the second joint element. The second joint element is rotatably connected, via a third bearing, around a third axis of rotation of the named axes of rotation to the driving element.

The first joint element and the second joint element are rotatably displaceable, via the second bearing, along the second axis of rotation relative to each other. The driving element and the second joint element are displaceable relative to each other, via the third bearing, along the third axis of rotation.

A rotational movement and a linear movement are enabled at the second bearing and at the third bearing by a bearing journal and a bearing bore, respectively. The bearing journal is rotatably accommodated and axially displaceable in the bearing bore. This can also be represented by a sliding bearing or also by a rolling member bearing.

For simplification, the lubrication of all bearings can have a common lubricant supply. In this case, for example, a lubrication nipple can be provided. The nipple is connected, via lubrication channels, to all bearings. Thus, by transporting the lubricant through the lubrication nipple all three bearings can be lubricated.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
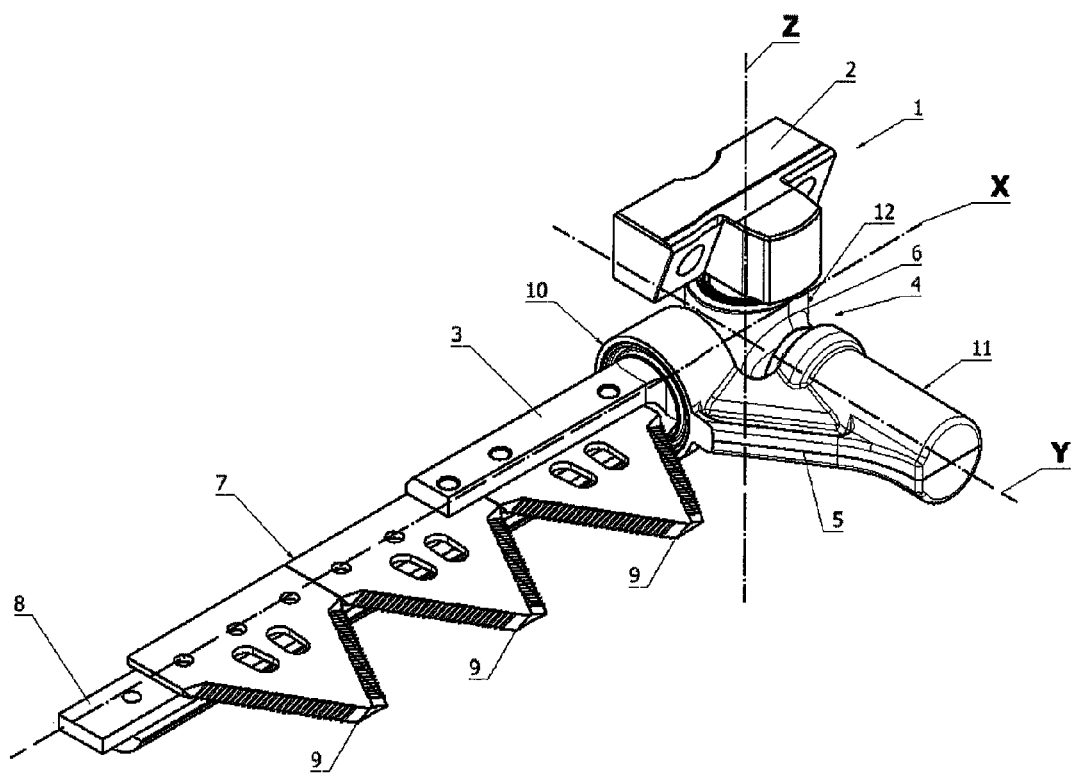
FIG. 1 is a perspective view of the connecting arrangement with a mower knife.

FIG. 1 is a perspective representation of a connecting arrangement 1 with a driving element 2 and an output element 3 that are connected to each other, via a compensation arrangement 4. The driving element 2 is formed as a driving adapter that can be connected to a driving journal of a gearbox. An example is described in DE 39 31 736 C2 and DE 10 2005 048 766 A1. The output element 3 is, as shown in FIG. 1, connected to a mower knife 7. The mower knife 7 includes a knife back 8 on which several knife blades 9 are mounted.

The driving element 2 is driven along the X-axis, which is also designated as knife axis. It is driven by the above named gearbox. The driving element 2 is reciprocatingly moved.

Due to manufacturing and assembly tolerances, as well as deformation of the individual components during operation, angular deviations can occur between the moving direction of the driving journal of the gearbox and the knife or X-axis. This means that the knife axis and the moving direction of the driving element 2 do not extend parallel to each other. In this case, during operation, tension of the drive and especially of the mower knife 7 occurs. Thus, increased frictional forces and/or bending forces are produced that lead to an increased wear. If the moving direction of the driving element 2 does not extend parallel to the knife axis, relative movements constantly produced during operation have to be compensated for between the driving element 2 and the output element 3. Accordingly, the compensation arrangement 4 serves this purpose.

The compensation arrangement 4 includes a first joint element 5 and a second joint element 6. The output element 3 is connected, via a first bearing 10, to the first joint element 5. The first joint element 5 is again connected, via a second bearing 11, to the second joint element 6. The driving element 2 is connected, via a third bearing 12, to the second joint element 6.

The first bearing 10 enables rotation of the output element 3 relative to the first joint element 5 around the knife X-axis. The first bearing 10 axially holds the output element 3 in an undisplaceable manner relative to the first joint element 5. The first bearing 10 thus has one degree of freedom.

The second bearing 11 enables rotational movement of the first joint element 5 and the second joint element 6 relative to each other around a longitudinal Y-axis. The longitudinal Y axis is arranged vertically to the knife axis and is aligned in the mowing direction. The second bearing 11 further enables an axial displacement of the first joint element 5 and the second joint element 6 relative to each other along the longitudinal Y-axis. The second bearing 11 thus has two degrees of freedom.

The third bearing 12 enables rotational movement of the driving element 2 relative to the second joint element 6 around the vertical Z-axi. The vertical Z-axis is arranged at a right angle to the knife axis and to the longitudinal Y-axix. The third bearing 12 enables an axial displacement of the driving element 2 relative to the second joint element 6 along the vertical Z-axis. The third bearing 12 thus has two degrees of freedom.

The compensation arrangement 4 thus has five degrees of freedom. Three degrees of freedom enable rotation around all three named axis X, Y and Z. These axes could also be designated together as axes of rotation. Two degrees of freedom is provided for a displacement along both axes (Y, Z).

For each rotation around one of the axes X, Y and Z, a separate bearing 10, 11, 12 is provided. Thus, each rotational movement is compensated for by one of the bearings 10, 11, 12 around one of the axes X, Y, Z. Two of the bearings (11, 12) also provide linear movement. Thus, these bearings are also separated from each other. The bearings for the linear movement do, however, not have to compellingly enable at the same time a rotational movement. It is also possible to provide separate bearings for the rotational movements and for the linear movements.

Figure 2:
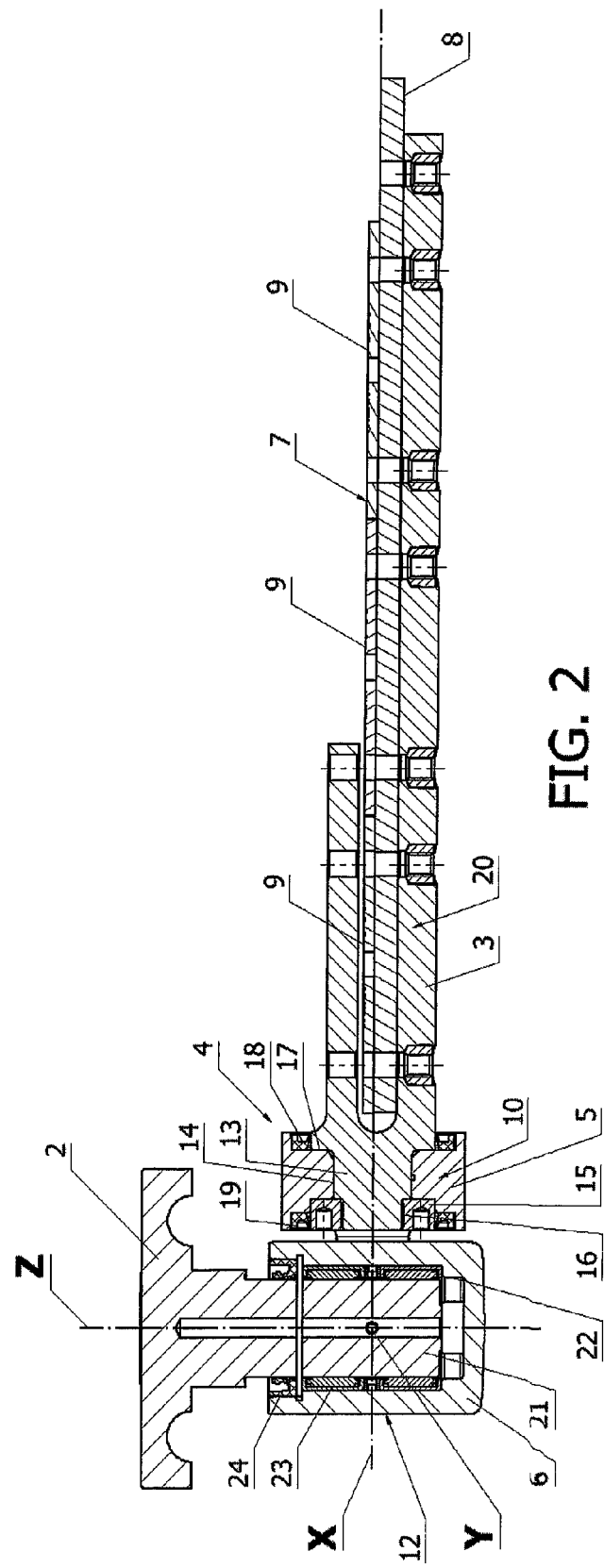
FIG. 2 is a longitudinal sectional view at a right angle to the longitudinal axis of the connecting arrangement of FIG. 1.

FIG. 2 shows a longitudinal sectional view of the connection arrangement 1 in a section plane that contains the knife X-axis and the vertical Z-axis. Visible are the first bearing 10 and the third bearing 12. The knife axis, which represents at the same time the axis of rotation of the first bearing 10, intersects the vertical Z-axis. The Z-axis is the axis of rotation of the third bearing 12. Furthermore, the longitudinal Y-axis, the axis of rotation of the second bearing 11, extends through the intersecting point of the knife axis and of the vertical Z-axis. Thus, the entire compensation arrangement 4 forms, at this intersecting point, a joint centre point.

The first bearing 10 includes a bearing journal 13 on the output element 3. The bearing journal 13 is rotatably supported in a bearing bore 14 of the first joint element 5. The bearing journal 13 projects axially from a knife connecting portion 20 of the output element 3 and is passed through the bearing bore 14. At the end facing away from the knife connecting portion 20, the bearing journal 13 has a thread 16. A nut 15 is screwed onto the thread 16. The nut 15 is axially supported in direction to the knife connecting portion 20 on the first joint element 5. In the opposite direction, the output element 3 is supported, via a shoulder 17, axially on the first joint element 5. The bearing journal 13 is supported, in this case, in a sliding manner within the bearing bore 14.

Two sealing rings 18, 19 are provided. One of the sealing rings 18 is arranged between the first joint element 5 and the output element 3. The other of the two sealing rings 19 is arranged between the first joint element 5 and the nut 15.

Generally, it is also possible, that the first joint element 5 has the bearing journal and the bearing bore is provided in the output element 3. Alternatively to sliding bearings, other bearings can also be provided, for example rolling member bearings.

Figure 4:
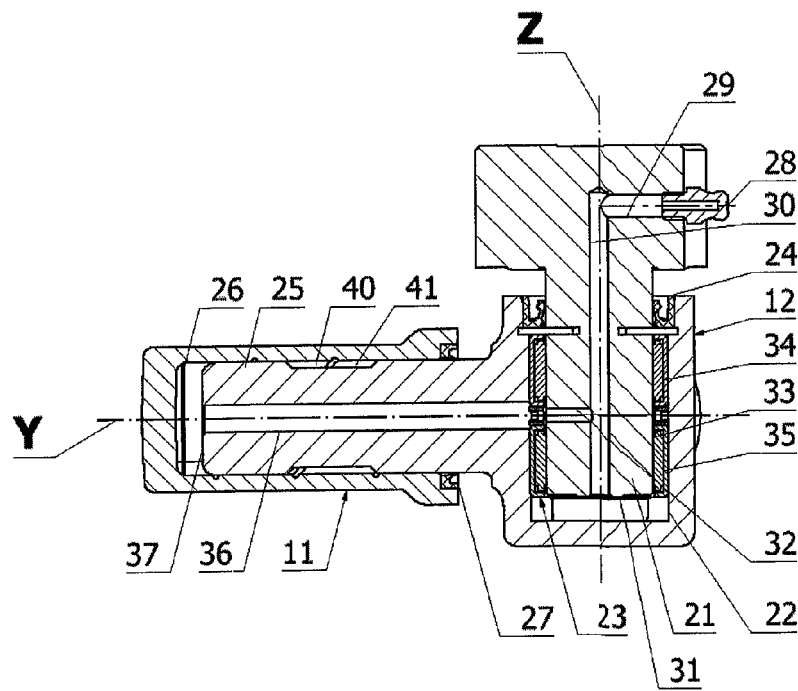
FIG. 4 is a longitudinal sectional view at a right angle to the knife axis of the connecting arrangement of FIG. 1.

The third bearing 12, also visible in FIG. 4, includes a bearing journal 21 on the driving element 2. A bearing bore 22 is in the second joint element 6. The bearing journal 21 is rotatably supported in the bearing bore 22. A needle roller bearing 23 is shown. Generally, also at this position, a different bearing, like for example a sliding bearing or a different roller member bearing, would be possible. Thus, the bearing journal 21 is rotatable within the bearing bore 22 around the vertical Z-axis. The needle member bearing 23 further enables an axial displacement of the bearing journal 21 within the bearing bore 22 along the vertical Z-axis.

The bearing bore 22 is formed as a blind hole bore. The blind hole bore 22 is sealed to the outside by a sealing ring 24 between the second joint element 6 and the driving element 2.

It is, generally, also possible, that the second joint element 6 has the bearing journal and the bearing bore is provided in the driving element 2.

Figure 3:
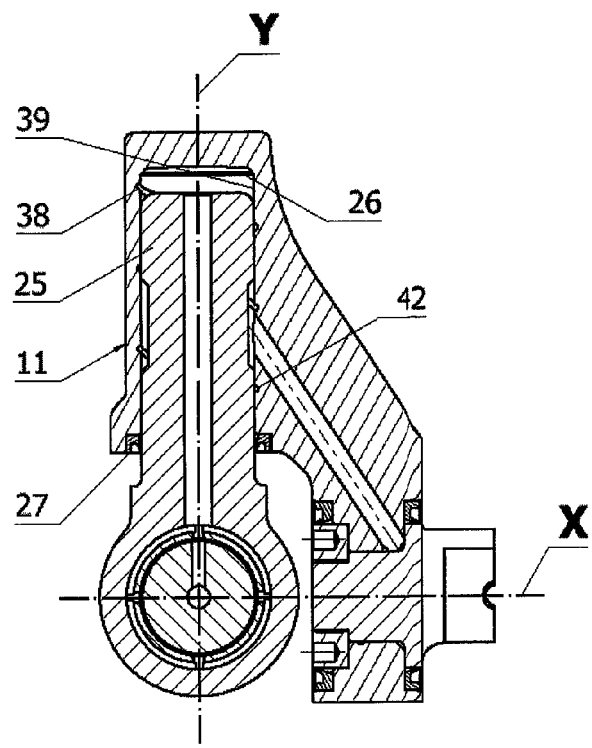
FIG. 3 is a longitudinal sectional view at a right angle to the vertical axis of the connecting arrangement of FIG. 1.

The second bearing 11 is shown in FIGS. 3 and 4. The second bearing 11 includes a bearing journal 25 of the second joint element 6. A bearing bore 26 is in the first joint element 5. The bearing journal 25 is rotatably accommodated in the bearing bore 26 around the longitudinal Y-axis. It is also axially displaceable along the same. Thus, the bearing journal 25 is supported in a sliding manner in the bearing bore 26. Generally, another bearing arrangement, like for example a roller member bearing, may be considered here. The bearing bore 26 is formed as a blind hole bore. The bearing bore 26 is sealed to the outside by a sealing ring 27. The sealing ring 27 is arranged between the first joint element 5 and the second joint element 6.

Generally, it can be considered here that the first joint element 5 has the bearing journal and the bearing bore is provided in the second joint element 6.

The third bearing 12 has a needle roller bearing 23. The driving element 2 does not only perform, by the above named gearbox, a reciprocating movement along the knife axis, but also a continuous movement rotating around the vertical Z-axis. Thus, the third bearing 12 has to completely compensate the rotation of the driving element 2 relative to the second joint element 6. Thus, especially, rolling member bearings are suitable. All other bearings, the first bearing 10 and the second bearing 11, do not have to compensate for either rotational movements or longitudinal movements, when the other bearings are aligned and adjusted properly. Only for the cases where manufacturing and assembly tolerances or deformations occur, compensational movements are produced in the bearings. Here, movements are rotating reciprocating movements or linear reciprocating movements, so that sliding bearings can be used. The bearings are separated from each other and for example not represented by a ball head. When using a ball head, it would not be design-wise defined, whether the rotation of the driving element 2 is compensated around the vertical Z-axis by the third bearing 12 or the needle member bearing 23 or by the ball head. Because of the drag moments within the third bearing 12, rotational movements could also be produced in the ball head, which could lead to fretting corrosion.

All bearings 10, 11, 12 have a common lubricant supply. A lubrication nipple 28 is provided in the driving element 2. The lubrication nipple 28 leads to a radially extending lubrication channel 29. This lubrication channel 29 ends in an axially extending lubrication channel 30. The channel 30 ends at an end face 31 of the bearing journal 21 and, thus, leads to the bearing bore 22. These channels enable lubricant flow to the needle bearing 23 to lubricate it. A radially extending lubrication channel 32 branches off from the axially extending lubrication channel 30. The lubrication channel 32 leads to a circumferential outer face 33 of the bearing journal 21. This radially extending lubrication channel 32 ends between two rows of needles 34, 35 of the needle bearing 23. The two rows of needles 34, 35 are arranged behind one another along the vertical Z-axis. The radially extending lubrication channel 32 is positioned such that, depending on the axial position of the bearing journal 21 within the bearing bore 22, it at least extends across an axially extending lubrication channel 36 during the rotation of the driving element 2. The axially extending lubrication channel 36 is arranged in the bearing journal 25 of the second bearing 11. This axially extending lubrication channel 36 leads to an end face 37 of the bearing journal 25 of the second bearing 11. Thus, the channel 36 provides lubricant to the bearing bore 26 of the second bearing 11 to lubricate the sliding bearing between the bearing journal 25 and the bearing bore 26. The lubricant gets through the bearing gap between the bearing journal 25 and the circumferential inner face 39 of the bearing bore 26 of the second bearing 11 and into an annular chamber 40. The chamber 40 is formed by a circumferential groove 41 in the bearing journal 25 and the circumferential inner face 39 of the bearing bore 26. As shown in FIG. 3, a helical groove 38 can be provided in the circumferential inner face 39. The groove 38 transports lubricant from the area of the end face 37 of the bearing journal 25 into the annular chamber 40.

The circumferential groove 41 is elongated formed in the axial direction. Thus, independent of the axial position of the bearing journal 25 in the bearing bore 26, the annular chamber 40 is also in fluid communication with a lubrication channel 42 of the first joint element 5. This lubrication channel 42 leads to the first bearing 10. The channel 42 provides lubricant to lubricate the sliding bearing in the first joint element.

Thus, as the lubricant enters through only one lubrication nipple 28, the lubrication of all three bearings 10, 11 and 12 is achievable.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A connecting arrangement for connecting a mower knife drive to a mower knife reciprocatingly moving along a knife or X-axis, comprising:
   a driving element for connecting the connecting arrangement to a mower knife drive;
   an output element for connecting the connecting arrangement to the mower knife;
   a compensation arrangement coupling the driving element and the output element, the compensation arrangement rotatable around three axes of rotation arranged at a right angle to each other and displaceable along at least two of the axes of rotation relative to each other; and
   each axis of rotation of the compensation arrangement includes a separate bearing comprising a first bearing, a second bearing and a third bearing, the driving element and the output element are rotatable relative to each other, via the separate bearings.

2. The connecting arrangement according to claim 1, wherein the driving element and the output element are displaceable relative to each other by two of the bearings.

3. The connecting arrangement according to claim 2, wherein the compensation arrangement further comprises:
   a first joint element and a second joint element, the output element is rotatably connected, via the first bearing, around a first axis of rotation of the axes of rotation to the first joint element;
   the first joint element is rotatably connected, via the second bearing, around a second axis of rotation of the axes of rotation to the second joint element; and
   the second joint element is rotatably connected, via the third bearing, around the third axis of rotation of the axes of rotation to the driving element.

4. The connecting arrangement according to claim 3, wherein the first joint element and the second joint element are rotatably displaceable via the second bearing along the second axis of rotation relative to each other.

5. The connecting arrangement according to claim 3, wherein the driving element and the second joint element are slidable relative to each other, via the third bearing, along the third axis of rotation.

6. The connecting arrangement according to claim 3, wherein the second bearing and the third bearing each have a bearing journal and a bearing bore where the bearing journal is rotatably accommodated and axially displaceable.

7. The connecting arrangement according to claim 1, wherein all the separate bearings have a common lubricant supply.

8. The connecting arrangement according to claim 7, wherein a lubrication nipple is connected, via lubrication channels, to all the separate bearings.

9. A connecting arrangement for connecting a mower knife drive to a mower knife reciprocatingly moving along a knife or X-axis, comprising:
   a driving element for connecting the connecting arrangement to a mower knife drive;
   an output element for connecting the connecting arrangement to the mower knife;
   a compensation arrangement coupling the driving element and the output element, the compensation arrangement rotatable around three axes of rotation arranged at a right angle to each other and displaceable along at least two of the axes of rotation relative to each other;
   each axis of rotation of the compensation arrangement includes a separate bearing comprising a first bearing, a second bearing and a third bearing, the driving element and the output element are rotatable relative to each other, via the separate bearings;
   wherein the compensation arrangement further comprises a first joint element and a second joint element, the output element is rotatably connected, via the first bearing, around a first axis of rotation of the axes of rotation to the first joint element;
   the first joint element is rotatably connected, via the second bearing, around a second axis of rotation of the axes of rotation to the second joint element; and
   the second joint element is rotatably connected, via the third bearing, around the third axis of rotation of the axes of rotation to the driving element.

10. The connecting arrangement according to claim 9, wherein the first joint element and the second joint element are rotatably displaceable via the second bearing along the second axis of rotation relative to each other.

11. The connecting arrangement according to claim 9, wherein the driving element and the second joint element are slidable relative to each other, via the third bearing, along the third axis of rotation.

12. The connecting arrangement according to claim 9, wherein the second bearing and the third bearing each have a bearing journal and a bearing bore where the bearing journal is rotatably accommodated and axially displaceable.

* * * * *

UNITED STATES PATENT AND TRADEMARK OFFICE
CERTIFICATE OF CORRECTION

PATENT NO. : 9,992,929 B2
APPLICATION NO. : 15/368581
DATED : June 12, 2018
INVENTOR(S) : Heinrich Günter Schumacher et al.

It is certified that error appears in the above-identified patent and that said Letters Patent is hereby corrected as shown below:

On the Title Page

Item [72], Column 1, Line 1 Inventors,     "Gunter" should be --Günter--.

(*) Notice, Column 1,     "days. days." should be --days.--.

Signed and Sealed this
Eleventh Day of September, 2018

Andrei Iancu
*Director of the United States Patent and Trademark Office*